UNITED STATES PATENT OFFICE.

MORDUCH L. KAPLAN, OF BROOKLYN, NEW YORK.

PROCESS FOR THE OXIDATION OF MANGANESE CARBONATE.

1,247,278.     Specification of Letters Patent.     Patented Nov. 20, 1917.

No Drawing.     Application filed April 30, 1917. Serial No. 165,483.

*To all whom it may concern:*

Be it known that I, MORDUCH L. KAPLAN, a citizen of the United States, and a resident of Brooklyn, in the county of Kings and State of New York, have invented certain new and useful Improvements in Processes for the Oxidation of Manganese Carbonate, of which the following is a specification.

The object of this invention is to provide novel processes, whereby manganese carbonate may be rapidly, economically and with great efficiency oxidized.

Manganese carbonate $MnCO_3$, as it is well known, when exposed to the action of hot air absorbs oxygen and loses carbonic acid gas $$2MnCO_3 + O_2 = 2MnO_2 + 2CO_2$$

This reaction, as it is known, begins at 260° centigrade, but is at this low temperature very slow and therefore of no practical value; only at much higher temperatures it becomes more rapid, but at very high temperatures the carbonate is not a stable compound, especially in presence of $MnO_2$, and it decomposes according to the following equations:

$$MnCO_3 = MnO + CO_2$$
$$MnCO_3 + MnO_2 = Mn_2O_3 + CO_2$$

The resulting products of the air oxidation therefore always contain considerable quantities of MnO and the ratio $MnO_2$:MnO is the lower, the higher the temperature was kept during the treatment. For the above reasons and also for the reason that $MnO_2$ above 300° C. loses O changing into a lower oxid, the oxidation of $MnCO_3$ with hot air must be conducted carefully and slowly and even in the best case, it is a matter of hours. I have discovered a new process whereby $MnCO_3$ can be oxidized very rapidly, and it consists in subjecting the carbonate at temperatures not much above 300° C. to the action of oxids of nitrogen, such as the decomposition products of nitric acid $$2HNO_3 = 2NO_2 + O + H_2O.$$

The oxidation proceeds according to the equation:

$$MnCO_3 + NO_2 = MnO_2 + NO + CO_2,$$

and as NO combines with oxygen, $2HNO_3$ are capable of oxidizing $3MnCO_3$. Instead of using pure vapors of nitric acid I have found it more practical to mix the same with large quantities of air in which case a small quantity of nitric acid, on account of regeneration of $NO_2$ from NO and oxygen of the air, can be made to oxidize large quantities of carbonate. I have found also that instead of vapors of nitric acid, $NO_2$ liberated by heat or dilution from its solution in $H_2SO_4$, such solution having been obtained by passing the gases from the oxidation chamber together with air through sulfuric acid, can be used with the same results as to rapidity of reaction and composition of product. Instead of starting the reaction with oxids of nitrogen, it can be started with air alone and the hot carbonate then transferred to a chamber containing oxids of nitrogen, which way of working has the advantage that the heating of the carbonate can be done in heat conducting metallic vessels, from which the hot carbonate is removed on its transference to said chamber.

What I claim as my invention and desire to secure by Letters Patent, is:

1. The process hereinbefore described of oxidizing manganese carbonate, comprising the subjection of the manganese carbonate, highly heated, to the action of an oxid of nitrogen containing more oxygen than NO.

2. The process hereinbefore described of oxidizing manganese carbonate, comprising the heating of the manganese carbonate to a temperature above 300° centigrade and subjecting the same to the action of an oxid of nitrogen containing more oxygen than NO.

3. The process hereinbefore described of oxidizing manganese carbonate, comprising the subjection of the manganese carbonate, highly heated, to the action of vapors of nitric acid.

4. The process hereinbefore described of oxidizing manganese carbonate, comprising the subjection of the manganese carbonate, highly heated, to the action of vapors of nitric acid admixed with air in larger proportion than said vapors.

5. The process hereinbefore described of oxidizing manganese carbonate, comprising the heating of the manganese carbonate to a temperature of above 300° centigrade and subjecting the same to the action of vapors of nitric acid admixed with air in larger proportion than said vapors.

6. The process hereinbefore described of oxidizing manganese carbonate comprising the subjection of the same, highly heated, to the action of an oxid of nitrogen containing oxygen not less than NO in presence of air.

7. The process hereinbefore described comprising the partial oxidation of manganese carbonate by hot air and subjecting the same for further oxidation to the action of a mixture of air with an oxid of nitrogen containing oxygen not less than NO.

Signed at New York, in the county of New York, and State of New York, this 28th day of April, A. D. 1917.

MORDUCH L. KAPLAN.

Witnesses:
ARTHUR MARION,
CHAS. C. GILL.